(No Model.)

R. W. HARE & R. SPROUL.
TWO WHEELED VEHICLE.

No. 375,287. Patented Dec. 20, 1887.

WITNESSES:
J. B. McGinn.
Geo. M. Copenhaver.

Robert W. Hare
and Robert Sproul
INVENTORS

BY Connolly Bros.
ATTORNEYS

UNITED STATES PATENT OFFICE.

ROBERT W. HARE AND ROBERT SPROUL, OF PITTSBURG, PENNSYLVANIA.

TWO-WHEELED VEHICLE.

SPECIFICATION forming part of Letters Patent No. 375,287, dated December 20, 1887.

Application filed May 7, 1887. Serial No. 237,440. (No model.)

*To all whom it may concern:*

Be it known that we, ROBERT W. HARE and ROBERT SPROUL, citizens of the United States, residing at Pittsburg, in the county of Allegheny and State of Pennsylvania, have invented certain new and useful Improvements in Two-Wheeled Vehicles; and we do hereby declare the following to be a full, clear, and exact description of the invention, reference being had to the accompanying drawings, which form a part of this specification.

Our invention has relation to vehicles, and relates, particularly, to that class of vehicles known as "cabs;" and our invention has for its object the provision of a new and novel form of vehicle which will be neat and attractive exteriorly, which will have a roomy and comfortable interior, and which, by reason of the manner in which it is balanced upon the axle and the general construction and arrangement of parts, will impose less work upon the horse than the cabs or other two-wheeled passenger-vehicles now in use.

Our invention consists in the novel construction and arrangement of parts hereinafter described and claimed.

Broadly, our invention consists in a cab having doors hinged to a vertical post at the front of the vehicle, and, further, in the combination therewith of a driver's seat arranged in front of said vertical post and at or about the level of the seat within the cab.

Figure 1:
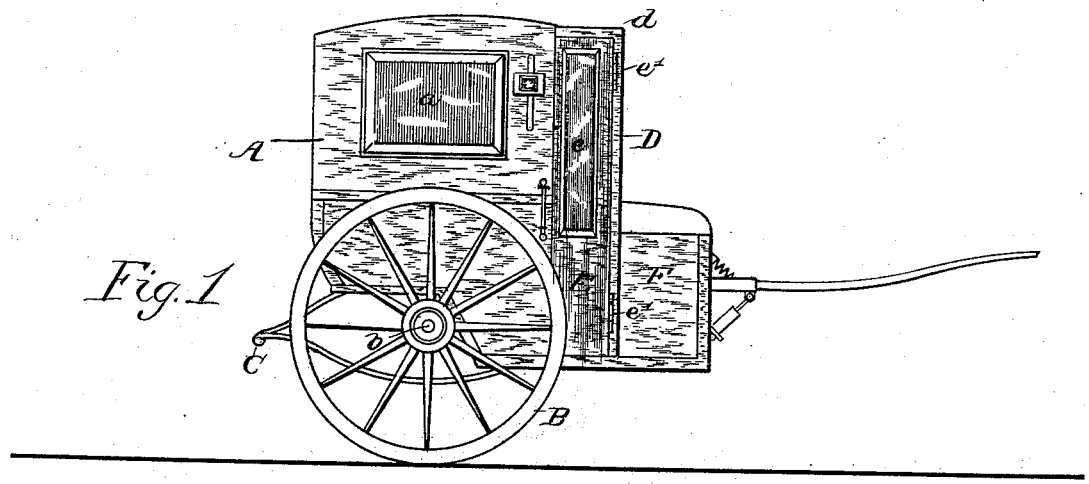
Figure 2:
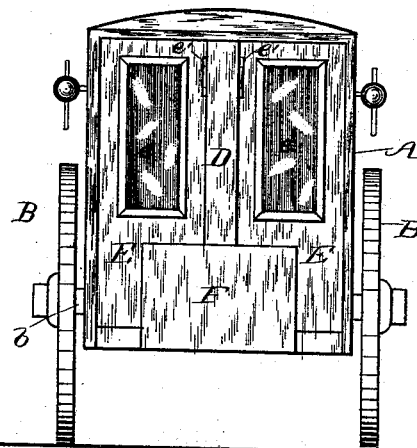
Figure 3:
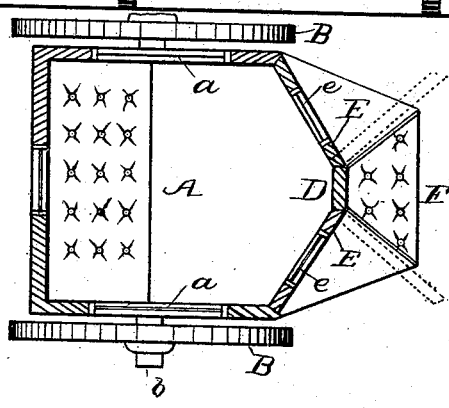

Referring to the accompanying drawings, Figure 1 is a side elevation of a two-wheeled vehicle constructed according to our invention; Fig. 2, a front elevation of the same, and Fig. 3 a horizontal sectional view.

A designates the body of the vehicle, which is quite similar in form to and possesses the same attractive appearance as the closed coupés now extensively used. Said body is practically square in horizontal section, and is provided with large side windows, $a\ a$, giving light to the interior and allowing the passenger an extensive view on each side. The body A is mounted upon wheels B and axle $b$, suitable springs, C, being interposed in the ordinary manner. The top of the body A terminates at $d$, and from the point $d$ to the floor of the vehicle, which projects considerably farther forward than the top, a stout post or standard, D, extends, being firmly secured upon and forming a portion of the frame of the vehicle. Two doors, E E, in which are windows $e\ e$, are hinged to the post D at $e'\ e'$ and close the front of the vehicle-body. The post D is, it will be remarked, set slightly in advance of the sides of body A, and the doors E E are therefore, when closed, at a slightly greater angle than a right angle to the said sides.

As before stated, the floor of the body of the vehicle extends out beyond the roof, and upon inspection of Fig. 2 of the drawings it will be observed that the floor diminishes in width toward the front. Upon said floor, and in front of the post or standard D, is erected a triangular box, F, the top of which is about on a level with or slightly above the level of the seat or seats within the vehicle. A footboard is fixed in front of the box F, and upon top of said box is placed the driver's cushion, the interior of the box being utilized as a receptacle for robes, covers, &c.

The vehicle so constructed has many advantages not possessed by any vehicle heretofore constructed. The position of the driver's seat is such that he has perfect control of the horse and at the same time can open and close either of the doors by merely reaching back with one hand and without turning the body or head.

Another advantage is that the weight of the vehicle, the driver, and passengers is as nearly as possible balanced upon the wheels, the extra weight in front being but slight, and being imposed upon the horse's back, and not, as in the Hansom and other cabs of that type, upon the girth or belly-band. The driver's seat being set low down, there is less danger of the driver being injured should the horse fall than where the seat is high up or on top of the vehicle.

The arrangement of the doors at an angle to the sides of the vehicle adds considerably to the attractive appearance of the vehicle, permits the passenger within the vehicle to look out with greater ease and convenience, and makes it easier to get into and out of the vehicle.

A still further advantage not heretofore set forth is that when it is desired to leave the doors of the cab open the same can be done without in any manner discommoding the passenger or the driver, and without swinging the doors outside the sides of the cab, as must be done when it is desired to open the doors in cabs of the usual construction.

In our improved cab the doors, when open, lie against the sides of the driver's seat, but do not in any way interfere with the driver's motion. In this position, too, the doors are entirely out of the way of the passenger when entering or leaving the vehicle.

Having fully described our invention, we claim—

In a two-wheeled vehicle, the combination, with the body of the vehicle, of the doors E E, hinged at an angle to the vertical post D, and the driver's seat arranged in front of said vertical post and below the tops of the doors, substantially as described.

In testimony that we claim the foregoing we have hereunto set our hands this 3d day of May, 1887.

ROBERT W. HARE.
ROBERT SPROUL.

Witnesses:
LOUIS MOESER,
JOSEPH ROHM.